July 26, 1938.  E. C. LEACH ET AL  2,124,624
SELF-LOADING VEHICLE
Filed April 9, 1937  2 Sheets-Sheet 1
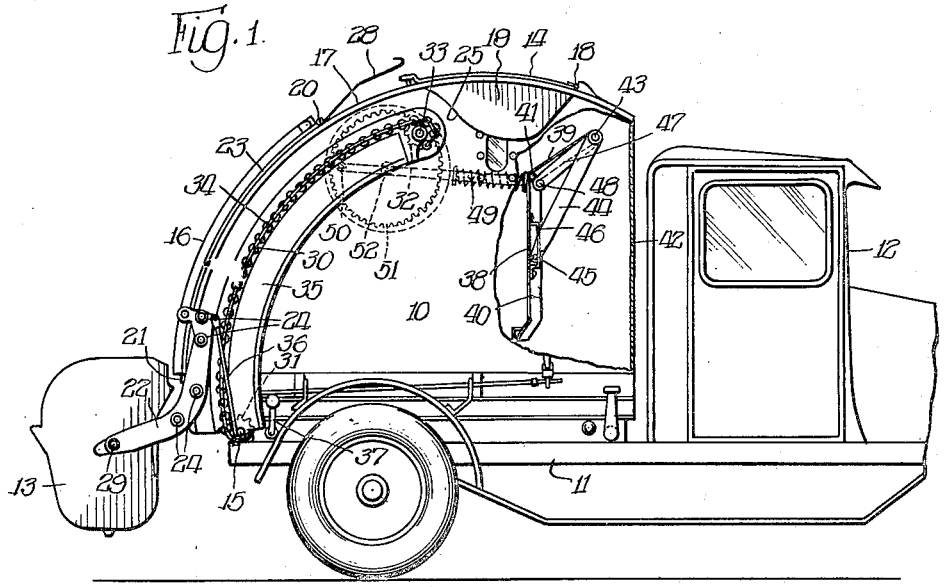
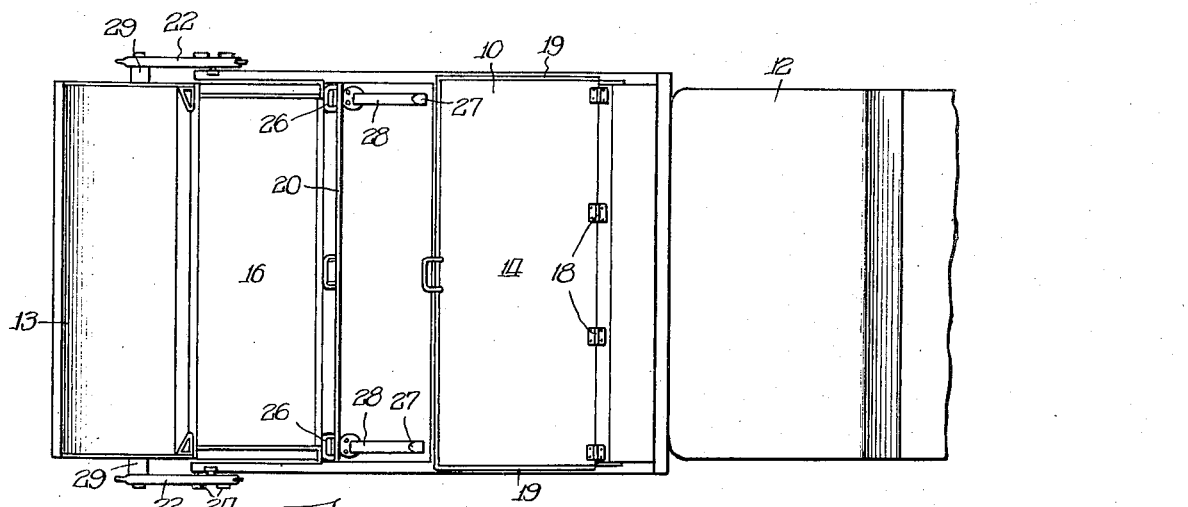
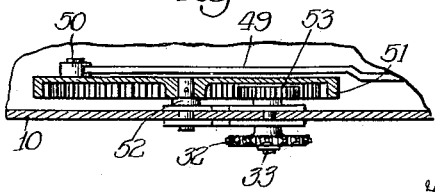
Inventors:
Elbert C. Leach,
Otto F. Manthie,
By Cromwell, Greist + Warden
Attys.

July 26, 1938.  E. C. LEACH ET AL  2,124,624
SELF-LOADING VEHICLE
Filed April 9, 1937  2 Sheets-Sheet 2

Inventors:
Elbert C. Leach,
Otto F. Marthie,
By Cromwell, Greist & Warden
Attys.

Patented July 26, 1938

2,124,624

UNITED STATES PATENT OFFICE 2,124,624

SELF-LOADING VEHICLE

Elbert C. Leach and Otto F. Manthie, Oshkosh, Wis., assignors of one-half to Leach Company, Oshkosh, Wis., a corporation of Wisconsin and one-half to The Elgin Corporation, Chicago, Ill., a corporation of New York Application April 9, 1937, Serial No. 135,869

3 Claims. (Cl. 214—67)

This invention has to do with self-loading vehicles of the type disclosed in Leach and Hamren application Serial No. 733,104, filed June 29, 1934, Patent No. 2,087,348, granted July 20, 1937, and is particularly concerned with the provision of means for increasing the load capacity of the body of the vehicle without increasing the size of the body.

In vehicles of this type difficulty has been experienced in loading the body to its full capacity, due to the loose uncompacted character of the rubbish ordinarily picked up in street collection service, which tends to rapidly fill up the body and prevent the entry of more rubbish long before the prescribed capacity of the body in pounds has been reached.

The purpose of the present invention is to provide a device in the body of the vehicle which will compact the entering rubbish automatically in coordination with the travel of the loading bucket, whereby to leave room for the entry of more rubbish right up to the point of full load.

Other more specific objects and advantages of the invention will be apparent to those skilled in the art upon a full understanding of the construction, arrangement and operation of the new compressor.

A preferred embodiment of the invention is presented herein for the purpose of exemplification, in connection with one particular form of self-loading vehicle, but it will of course be appreciated that the invention is susceptible of embodiment in other forms, for use with the same or other kinds of self-loading vehicles, without departing from the spirit of the invention as defined in the appended claims.

In the accompanying drawings:

Fig. 1 is a side view of a self-loading vehicle equipped with the new compressing device, showing the bucket in its lowered position and the compressor plate in its advanced position;

Fig. 2 is a plan view of the vehicle;

Fig. 6 is a partially sectioned plan view of the gearing employed to reciprocate each of the connecting links.

Figure 3:
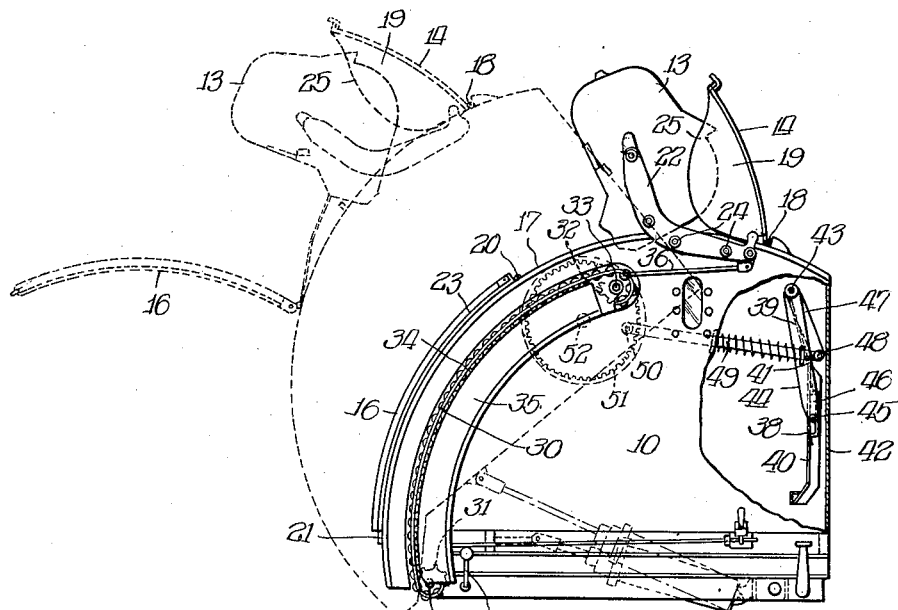
Fig. 3 is another side view, of the body only, showing the bucket in its raised position and the compressor plate in its retracted position, and showing the body in full lines in its load receiving position and in dotted lines in its load dumping position.
Figure 5:
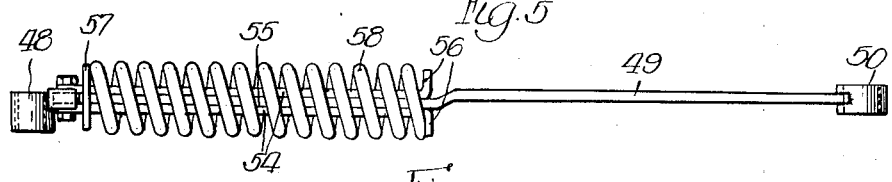
Fig. 5 is a plan view of one of the resiliently yieldable connecting links between the bucket operating mechanism and the compressor plate.
Figure 4:
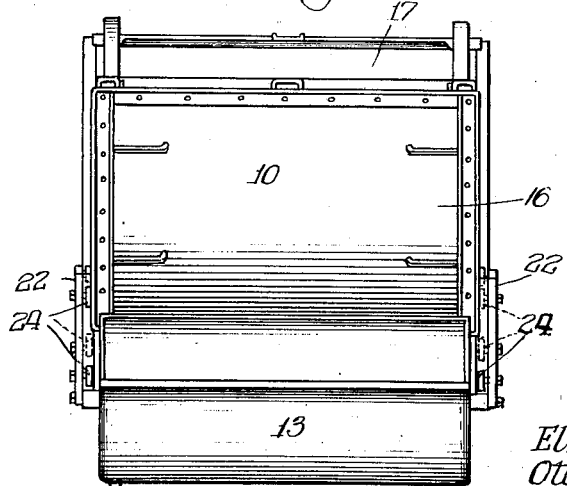
Fig. 4 is a rear end view of the body.

The vehicle which is shown in the drawings includes a large tank-like body 10 which is mounted on the chassis 11 of a motor truck 12. The garbage, rubbish, or other material to be collected is emptied from individual containers into a trough-like bucket 13 which is positioned close to the ground at the rear end of the body. After the bucket 13 has been filled it is elevated to the top of the body 10 and dumped into the latter through an opening which is normally closed by a door 14. After the body 10 has been loaded to capacity in this way the vehicle is driven to any suitable point of disposal, where the body is tilted rearwardly on the chassis 11, about the axis of a shaft 15 to which the body is pivotally attached, and the contents discharged through a rear opening which is normally closed by a door 16.

The body 10 is completely enclosed. The front and side walls of the body extend straight up and down, while the top and rear walls are curved and are merged together in a single arcuate surface 17. The loading door 14 is hinged to the body at 18 and is provided at its ends with downwardly extending plates 19, which plates fit against the sides of the body when the door is shut and serve to close off the otherwise exposed gaps at the ends of the door when the latter is open. The discharging door 16 is hinged to the body at 20 and is normally held shut and tightly sealed by a latching device 21.

The bucket 13 is pivotally supported at its ends on arms 22 which are adapted to travel along curved guide rails 23 on anti-friction rollers 24 journaled on the arms. The rails 23 are located on the curved edges of the sides of the body and project laterally somewhat beyond the same, being slotted at the ends of the door 14 to receive the end closure plates 19. As the bucket 13 approaches the closed door 14, the foremost rollers 24 on the arms 22 engage with curved edges 25 on the plates 19 and cam the door upwardly into its open position. Just before the bucket 13 reaches the location of the door 14, handles 26 on the bucket engage with hooks 27 on the ends of downwardly yielding spring fingers 28 attached to the body and cause the bucket as it continues its forward movement to rotate on its trunnions 29 into an inverted position in register with the opening exposed by the raised door 14, thereby allowing the bucket to dump its contents into the body, with the lip of the bucket projecting down through the opening, and with the ends of the bucket shielded by the overlapping end plates 19 on the door.

The bucket 13 is raised and lowered by means of endless chains 30 which are trained over sprockets 31 and 32 at opposite sides of the body. The lower sprockets 31 are secured to the shaft 15 on which the body is hinged, while the upper sprockets 32 are merely idlers and are secured to stub shafts 33 which are journaled in the sides of the body. The chains 30 are caused to travel in arcuate paths concentric with the rails 23 by suitable guides 34, and are enclosed for the most part within guards 35. The chains—which move in one direction when the bucket is being raised and move in the opposite direction when the bucket is being lowered—are connected with the arms 22 by rigid coupling links 36. The shaft 15 and the lower sprockets 31 are rotated, first in one direction and then in the other, by power obtained from the motor of the truck, through suitable power-transmitting means (not shown) conveniently controlled by an operating lever 37.

The power-transmitting means in this particular form of self-loading vehicle for raising and lowering the bucket 13 and also for tilting the body 10, has been illustrated and described in detail in Leach and Hamren application Serial No. 733,104 and therefore will not need to be again described here. The present invention resides in the hereinafter described compressing device.

An articulated two-part compressor plate 38, composed of upper and lower sections 39 and 40 which are hinged together at 41, is arranged in a substantially vertical position in the body 10 adjacent the front end wall 42 of the latter. The upper section 39 of the plate 38 is rigidly attached to a cross shaft 43 in the top of the body, and the lower section 40 extends downwardly to a point close to the bottom of the body. The plate 38 preferably takes up substantially the full width of the body and moves back and forth between the advanced position shown in full lines in Fig. 1 and the retracted position shown in dotted lines in that view. During its movement the lower section 40 of the plate, which is the larger one of the two sections, is maintained in a substantially upright position by means of arms 44 which are loosely mounted on the shaft 43 at the sides of the plate and are provided at their lower ends with pins 45 which project into vertical slots 46 in the sides of the lower section 40.

The cross shaft 43 is rocked back and forth, to move the plate 38 between its advanced and retracted positions, by means of arms 47 which are rigidly secured to the shaft 43 at the sides of the upper section 39. These arms 47 are pivotally connected at 48 to horizontally extending links 49, and the links 49 are in turn pivotally connected at 50 to the peripheries of ring gears 51 journaled on studs 52 mounted in the sides of the body 10. The ring gears 51 mesh with small pinions 53 which are secured to the previously described stub shafts 33 to which the idler sprockets 32 for the chains 30 are also secured.

When the bucket 13 is raised, the consequent movement of the pinions 53 causes the ring gears 51 to turn through a half revolution, thereby moving the compressor plate 38 from the advanced compressing position shown in full lines in Fig. 1 to the retracted out-of-the-way position shown in dotted lines in that view. When the bucket 13, after having discharged its contents into the top of the body, is lowered, the ring gears 51 will turn a half revolution in the opposite direction, thereby moving the plate 38 in the reverse direction, from the full line position shown in Fig. 3 to the dotted line position shown in that view.

Each time the bucket 13 is lowered, whatever rubbish there may be in the body adjacent the top opening will be pushed by the plate 38 a short distance toward the rear end of the body, thereby always making room immediately beneath the opening for another bucketful of rubbish. As the body gradually fills up the plate 38 will exert more and more of a compressing or compacting action on the contents, until finally the contents will have been compacted to such an extent as to prevent the advancing movement of the plate. When this condition is reached, the body has of course received all the rubbish it will hold and is ready to be driven to the point where it is to be discharged of its contents.

In order that the bucket 13 may be always lowered all of the way down even though the body has finally been filled to such an extent as to prevent further advancing movement of the plate 38, the links 49 are rendered resiliently yieldable by being made in two overlapping sections 54 and 55. These sections are provided, respectively, with abutments 56 and 57 between which heavy coil springs 58 are compressed. When the plate 38 meets with too great a resistance in its advancing movement, the springs 58 will yield to permit the ring gears 51 to complete their movement and thereby allow the bucket to ride down into its lowermost position.

We claim:

1. In a self-loading vehicle, a body having an opening in the upper portion thereof, a loading bucket, means for raising and lowering the bucket to and from the opening, a compressor plate positioned in the body, and means connecting the plate with said bucket raising and lowering means for causing the plate to compress the contents of the body upon the lowering of the bucket and to move into an out-of-the-way position upon the raising of the bucket, said compressor plate being so constructed and arranged as to constitute in effect one of the material-confining end walls of the body.

2. In a self-loading vehicle, a body having an opening in the upper portion thereof, a loading bucket, means for raising and lowering the bucket to and from the opening, a compressor plate arranged in a vertical position in the body adjacent one end of the same, and means connecting the plate with said bucket raising and lowering means for causing the plate to move bodily toward the opposite end of the body to compress the contents of the body upon the lowering of the bucket and to move back into its first described position upon the raising of the bucket, said compressor plate being composed of articulated upper and lower sections, and said upper section being so disposed with respect to the lower section and end of the body as to prevent the entry of any material between the lower section and end of the body when the plate is moved to compress the material.

3. In a self-loading vehicle, a body having an opening in the upper portion thereof, a loading bucket, means for raising and lowering the bucket to and from the opening, a compressor plate arranged in a vertical position in the body adjacent one end of the same, and means connecting the plate with said bucket raising and lowering means for causing the plate to move bodily toward the opposite end of the body to compress the contents of the body upon the lowering of the bucket and to move back into its first described position upon the raising of the bucket, said connecting means being resiliently yieldable whereby to permit the bucket to be fully lowered even though the plate be held against further compacting movement by the resistance offered by the load.

ELBERT C. LEACH.
OTTO F. MANTHIE.